S. BROWN.
CAMERA.
APPLICATION FILED JAN. 20, 1915.
1,160,136.
Patented Nov. 16, 1915.
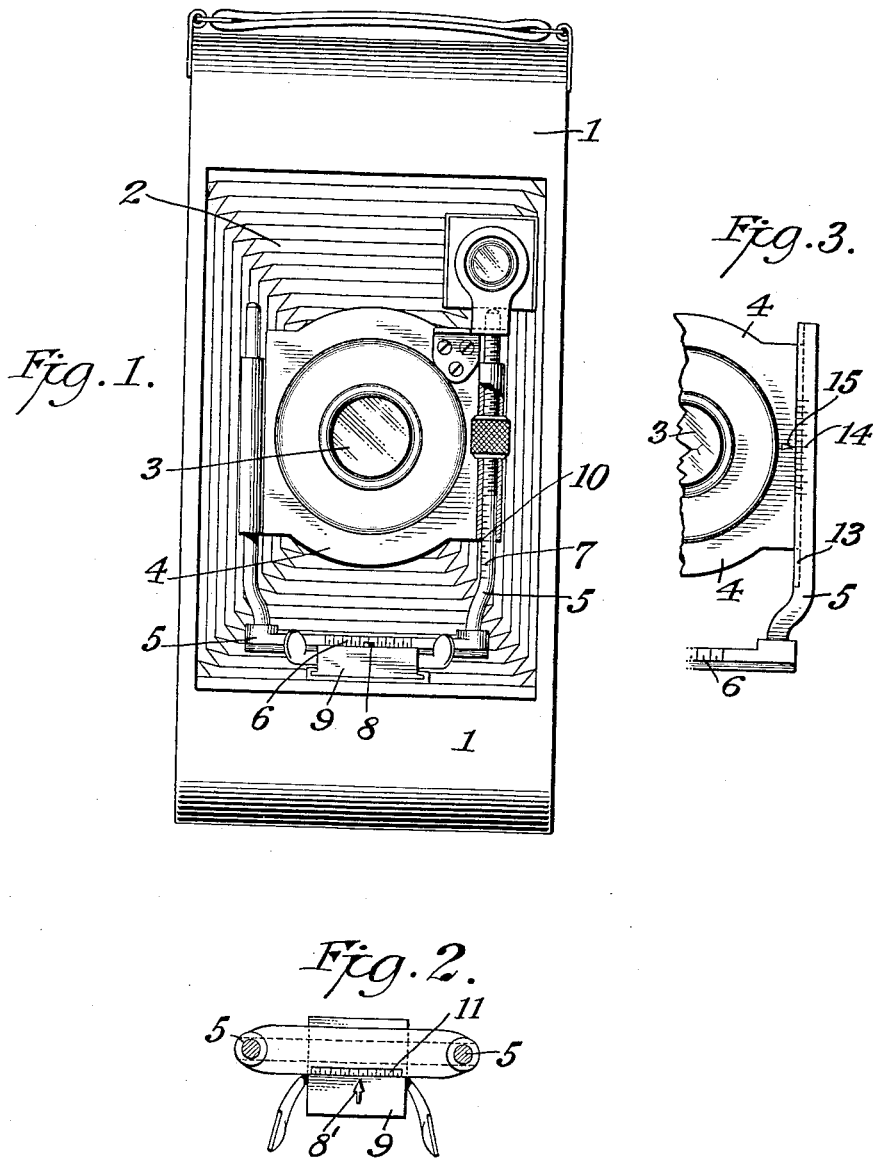

UNITED STATES PATENT OFFICE.

STANLEY BROWN, OF GARDEN CITY, NEW YORK.

CAMERA.

1,160,136. Specification of Letters Patent. Patented Nov. 16, 1915.

Application filed January 20, 1915. Serial No. 3,215.

*To all whom it may concern:*

Be it known that I, STANLEY BROWN, a citizen of the United States, and a resident of the city of Garden City, county of Nassau, and State of New York, have invented certain new and useful Improvements in Cameras, of which the following is a specification.

In practically all forms of camera, the folding type as well as box cameras, the axis of the lens of the finder is offset relative to the axis of the lens of the camera, which offsetting is sometimes in a vertical direction and sometimes in a horizontal direction and at various intervening angles. The degree of the offsetting differs, depending upon the size of the camera and of the finder and their respective constructions. Sometimes it is a matter of an inch or two only, and sometimes more, but in any event the result is likely to be a mislocation of the image upon the sensitive surface, which, if the focal distance is great, makes little if any difference, but when it is reduced to say a distance of from six to twenty five feet, or thereabout, then the mislocation becomes in some instances so marked as to injuriously affect the negative. In order, therefore, to assure accuracy in this respect, I provide cameras having a movable lens with indices upon the appropriate fixed parts of the lens frame, and a pointer of some sort upon the movable lens casing, which indices shall harmonize with the focal distance at which the exposure is made, in other words, so that the indices which register the degree of movement of the lens shall so harmonize with the distance scale of the camera as to compensate for the offsetting of the finder lens relative to the camera lens.

In the drawings, Figure 1 is an elevation of an ordinary folding camera showing my invention, the front board being lowered; Fig. 2 is a plan view showing a modified form of horizontal index to determine the degree of movement of the lens; Fig. 3 is an elevation of a modified construction of vertical index.

Referring first to Fig. 1, 1 is the camera body, 2 the bellows, 3 the lens, 4 the vertically movable lens casing, 5 the horizontally movable lens supporting frame. 6 are indices or scales upon the front edge of the horizontally movable bottom board or support for the lens frame, 7 are similar indices or scales upon one of the vertical standards of the lens supporting frame, upon which the lens casing 4 slides. The pointers of the construction shown in Fig. 1 may be as follows: 8 is a fixed pointer on the base block 9 and for the vertical scale 7 any suitable point, as, for example, the lower corner 10 of the lens casing 4 may be employed.

In Fig. 2 I show an arrangement differing somewhat from that shown in Fig. 1, in that the index or scale on the lower cross bar of the lens frame is made upon its upper surface instead of upon its forward edge, since it will sometimes be more conveniently observed in that position than when located as shown in Fig. 1. This index on the upper surface of the lower cross bar is shown at 11 and is provided with a fixed pointer 8' upon the block 9, which may be the same as the block 9 of Fig. 1.

Fig. 3 shows a construction in which the lens frame 4 instead of being provided with tubes at its edges, which slide upon the uprights 5, has its edges entered into recesses 13 made in the vertical standards 5. In this case the scale 14 may be made upon the face of an upright 5 and the fixed pointer 15 produced upon the side of the vertically movable lens frame.

The operation, in view of what has been already stated, is obvious and need not be further elaborated.

It will be obvious to those who are familiar with such matters that the examples I have illustrated and described are by no means the only forms in which the invention may be embodied, on the contrary, that alterations may be made therein without departing from the essentials of the invention; and further that the invention is equally useful where the finder is of the direct view type. I therefore do not confine myself to the constructions shown and described.

I claim:

1. In a camera having a finder adapted to quarter rotation only, a transversely movable camera lens and a distance scale, an index to determine the degree of transverse movement of the camera lens marked or figured to harmonize with the distance scale of the camera.

2. In a camera having a finder adapted to quarter rotation only and a distance scale, a vertically and horizontally movable camera lens and indices to determine the vertical and horizontal movement of the lens which are marked or figured to harmonize with the distance scale of the camera.

In testimony whereof I have signed my name to this specification in the presence of two subscribing witnesses.

STANLEY BROWN.

Witnesses:
F. M. DOUSBACH,
CORNELIUS P. MCLAUGHLIN.

Copies of this patent may be obtained for five cents each, by addressing the "Commissioner of Patents, Washington, D. C."